United States Patent [19]

Martin et al.

[11] Patent Number: 5,340,067
[45] Date of Patent: Aug. 23, 1994

[54] HAND AND WRIST SUPPORT FOR COMPUTER MOUSE

[76] Inventors: Teresa A. Martin, P.O. Box 18810, Boulder, Colo. 80308-1810; Beth M. Donovan, 101 Waltham St., #201, Watertown, Mass. 02172

[21] Appl. No.: 859,106

[22] Filed: Mar. 27, 1992

[51] Int. Cl.$^5$ .............................................. B43L 15/00
[52] U.S. Cl. ................................. 248/118.5; 248/918; 273/148 B
[58] Field of Search .................. 248/118, 118.1, 118.3, 248/118.5, 918; 132/73; 400/715, 717, 718; 273/148 B; 425/2, 412; 264/130, 133, 137

[56] References Cited

U.S. PATENT DOCUMENTS

| | | | |
|---|---|---|---|
| 1,135,155 | 4/1915 | Blundell | 248/118.3 |
| 1,590,479 | 6/1926 | O'Neill | 248/118.1 |
| 2,169,990 | 8/1939 | Preve | 132/73 |
| 2,682,725 | 7/1954 | Atwood | 425/2 X |
| 2,838,791 | 6/1958 | Theis | 425/2 |
| 3,295,518 | 1/1967 | Hazlewood et al. | 248/118 X |
| 4,422,640 | 12/1983 | Tamarkin | 273/148 B X |
| 4,494,755 | 1/1985 | Caillouet | 248/918 X |
| 4,585,017 | 4/1986 | Trujillo | 132/73 |
| 4,730,801 | 3/1988 | Cloward | 248/118 |
| 4,828,116 | 5/1989 | Garcia | 425/2 |
| 4,913,390 | 4/1990 | Berke | 248/118.3 X |
| 5,203,845 | 4/1993 | Moore | 248/918 |

OTHER PUBLICATIONS

Advertisement brochure, Computer Expressions.
AliMed, Inc. 1991, Cumulative Trauma Syndrome catalog, p. 28.
MACWeek magazine, Nov. 5, 1991.

*Primary Examiner*—Karen J. Chotkowski
*Attorney, Agent, or Firm*—Hamilton, Brook, Smith & Reynolds

[57] ABSTRACT

Provided is a method and apparatus for supporting the hand and wrist of a user of a computer mouse. The apparatus comprises a support block for supporting the hand and wrist and a retainer for retaining the mouse in fixed relation with the support block. In a preferred embodiment, the support block comprises a raised central area for pressing into the palm of the user's hand, an extended wrist rest for supporting the user's wrist, and a finger support area for supporting the user's fingers. The finger support comprises two extensions from the support block which grip the mouse, forming the retainer. The apparatus also trains the user to hold his hand in proper position while operating the mouse.

20 Claims, 5 Drawing Sheets

HAND AND WRIST SUPPORT FOR COMPUTER MOUSE

BACKGROUND OF THE INVENTION

A mouse is a device for inputting data into a computer. A mouse rolls on a mouse pad and, through mechanical or other means, sends positional and data selection information to the computer's processing unit. The term puck is also used to refer to a mouse-like input device, especially in the context of a graphic system. The puck often operates in concert with a tablet. As used in this document, the term "mouse" implies both mouse and puck input devices.

The mouse may be attached to the computer via a cable or it may use various cordless technologies to communicate with the computer. On the top side of the mouse are one or more command buttons. The number and exact arrangement of these buttons varies from vendor to vendor.

Although mice may differ in their exact style and appearance, their function and method of use is very similar, regardless of exact model. To communicate with the computer, the computer user must move the mouse and press selection buttons. Pressing and releasing the selection buttons is called clicking. This repetitive moving and clicking, as well as other activities associated with using the mouse, can cause tendinitis and other types of hand, wrist, and arm pain, referred to in general as Repetitive Stress Injuries (RSIs) or Cumulative Trauma Disorders (CTDs). Once the pain is present, a vicious cycle of use-pain-stop use/use-pain-stop use often begins and computer use becomes difficult.

Four factors contribute to cumulative trauma disorders:
- Highly repetitive motions
- Mechanical stresses
- Fast forceful exertions
- Awkward postures One of the more damaging types of repetitive motions is the continual flexion and extension of the middle finger, as might be caused by clicking the mouse button. Constant flexion and extension of the middle finger causes activation of the extensor carpi radialus brevis muscle and may cause subsequent impingement and irritation of the radial nerve.

Mechanical stresses are produced when soft tissues are squeezed between bone and external objects, such as the edge of a computer mouse. The magnitude of these stresses is related to the contact force and the area of contact. The greater the force and the smaller the contact area, the greater the stress. Tools that rub the sides of the fingers create mechanical stress that may cause digital nerve compression. Tools supported over the base of the palm may stress the median nerve and result in carpal tunnel syndrome.

Force is produced by contractile proteins in muscles and is transmitted through myofacial sheaths, tendons, bones, and ligaments. It results in elastic and viscous deformation of tissues. Risk of CTDs increases with the force of exertion. To cause problems, the exertion need be only as forceful as gripping a mouse. Muscles that stay tensed and still for a long time can become even more tired than muscles in motion. Gripping a mouse for extended periods of time as is common in computer work creates a high level of force of exertion.

Incorrect finger, hand, and wrist posture both increases force of exertion and is in and of itself a risk factor for cumulative trauma disorders. Movements of the wrist such as flexion, extension, and radial or ulnar deviation cause the tendons to be displaced past and against adjacent anatomic surfaces. Flexion and extension of the wrist are associated with tenosynovitis of the flexor and extensor tendons in the wrist and with carpal tunnel syndrome, one of the more common cumulative trauma disorders. Flexing the wrist causes the median nerve to be compressed between the finger flexor tendons and the flexor retinaculum, whereas extending the wrist cases the nerve to be stretched around the tendons. Nerves may also be stressed and compressed by exertion in certain postures, such as flexion of the fingers with the wrist flexed. Side to side deviations of the wrist are associated with tenosynovitis at the base of the thumb.

Incorrect mouse posture creates situations which stress the hand and put a user at risk of developing a CTD. The hand and wrist should be maintained in a neutral position, that is, neither flexed nor hyperextended nor deviated side to side. This posture can be demonstrated by letting the arm and hand hang relaxed at the side of body.

CTDs are increasingly common; according to federal statistics, reports of cumulative trauma disorders increased 538 percent between 1981 and 1990. It is estimated that one of every four injuries on the job involve fingers, hands, or wrists and fully half of those are related to CTDs. In fact, CTDs are now a major cause of lost time in many hand-intensive industries.

Some current methods of dealing with this problem are to stop using the computer entirely (not always feasible), to use a different type of interface altogether (often costly and not always practical) or to irretrievably alter the mouse so that it suits the specific individual (not always desirable).

SUMMARY OF THE INVENTION

The invention is a computer mouse apparatus and method comprising a support block for supporting the hand and wrist of a computer user and a retainer for retaining the mouse in fixed relation to the support block.

The block may comprise a raised area for pressing into the palm of the user's hand, an extended wrist rest area for supporting the user's wrist, or a finger support area for supporting the user's fingers, or any combination thereof. The term "finger" is understood to refer to all five digits including the thumb. The retainer may comprise extensions extending from the block to retain the mouse. In one embodiment of the invention, these extensions retain the mouse and provide the finger support area.

The invention provides a means of adapting an existing mouse. The invention prevents injury and re-injury by changing the movements used to perform the task of entering data with the mouse, thereby controlling repetition, stress, force, and posture, the four key risk factors for developing a cumulative trauma disorder.

The adaptation does not, however, alter the mouse, and may be removed when no longer needed or when a different user is working with the mouse. Additionally, the invention trains the hand and wrist to work in an ergonomically correct position, enabling the user to transport the benefits to systems on which the invention is not present.

In accordance with the invention, in one embodiment, injuries caused by the repetitive nature of using a computer mouse are ameliorated through ergonomic support which this device provides via a raised central ridge, an extended wrist support area, and support regions for the fingers. These cosine to keep the hand in a neutral position, thereby reducing wrist and finger fatigue and lessening unnecessary and excessive strain and stress on the tendons controlling the fingers and hand.

The invention also provides a method of customizing a computer mouse accessory for supporting the hand and wrist for an individual user. No two human hands are alike. The kit of the present invention enables a user or a therapist to adapt the basic model to the shape of a specific hand or specific mouse, or both, or to reinforce a specific course of therapy. The kit includes a mold which can be shaped to fit the user's hand and any particular mouse. A sheet of moldable material is also provided. The moldable material is molded to the shape of the mold and becomes the mouse accessory of the present invention.

The invention is removable, transportable, and does not harm or alter the original mouse. It both supports and trains the user in the ergonomically proper way to position the hand and wrist. Additionally, in its kit form the device can be shaped to meet any vendor's mouse, any user's hand, and any therapeutic goal.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION F THE INVENTION

Figure 1:
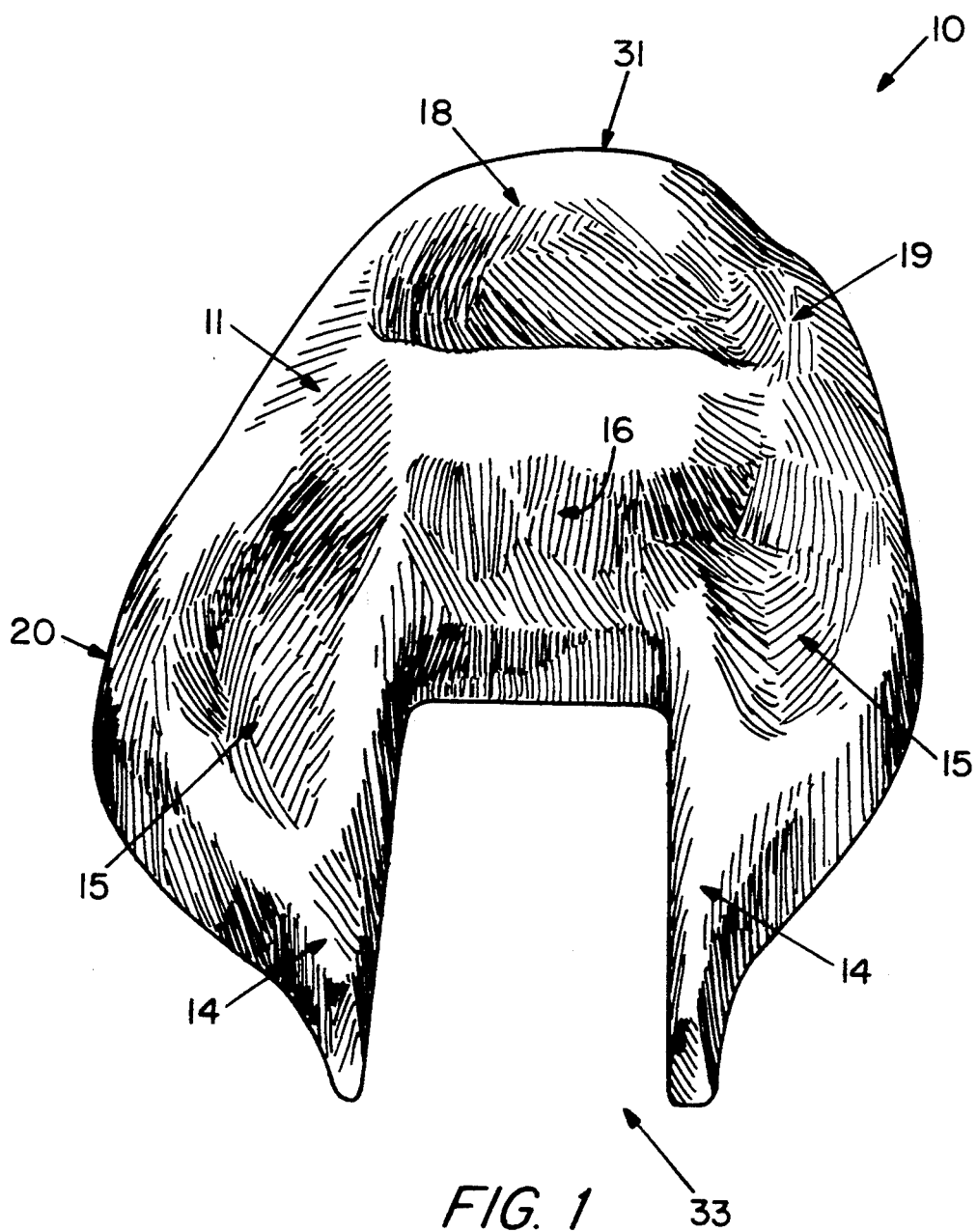
FIG. 1 is a perspective view of the preferred embodiment of the invention.

The preferred embodiment of the invention, as illustrated in FIGS. 1-4, helps eliminate the factors that cause CTDs and therefore ameliorates the problems of CDTs. FIG. 1 is a perspective view of the support device 10 of the present invention. Taken as a whole, the width and length of the device 10 provides a support block 11 for supporting the hand and a retainer in the form of side finger supports 14 for retaining the mouse in a fixed position in relation to the support block 11. The device 10 encourages the use of the larger more proximal musculature, such as the elbow and shoulder flexors and extensors, rather than the tiny hand muscles to move the mouse around the mouse pad or desk. The width of the device 10 combined with the side finger supports 14 prevent side to side deviation of the hand and wrist.

The side finger supports 14 at the distal end 33 of the device 10 hold the mouse securely in position so that the mouse and support device 10 glide smoothly together around the mouse pad or desk without becoming unattached. The side finger supports 14 embrace the mouse and provide finger grooves 15 as a resting place for the non-clicking fingers. The grooves 15 in the finger supports 14 help retain the fingers in position within the finger supports 14.

A raised area 16 near the center of the device 10 places gentle pressure on the palm of the hand, causing the fingers to relax and the wrist to extend slightly, without hyper-extending. With the exception of the raised area 16 near the center, the device 10 is substantially level with the mouse. A projected proximal area 18 at the proximal end 31 of the device 10 provides a wrist rest to keep the wrist supported in a neutral position and to distribute the mechanical stress proximal to the base of the palm.

A rough surface finish 19 is added across the top surface of the device 10. This increases friction between the device 10 and the user's hand, thus making the device 10 easier to grip. This results in a reduction in the force required in the hand in performing the task of controlling the mouse. In the preferred embodiment, the rough surface finish 19 is created by spraying the surface with a faux granite paint or other substance which creates a rough and grippable surface texture. A smooth bottom 20 on the device 10 enables the device 10 to glide easily on the user's desk or mouse pad, reducing the amount of force required to move the mouse across the mouse pad or desk.

Figure 2:
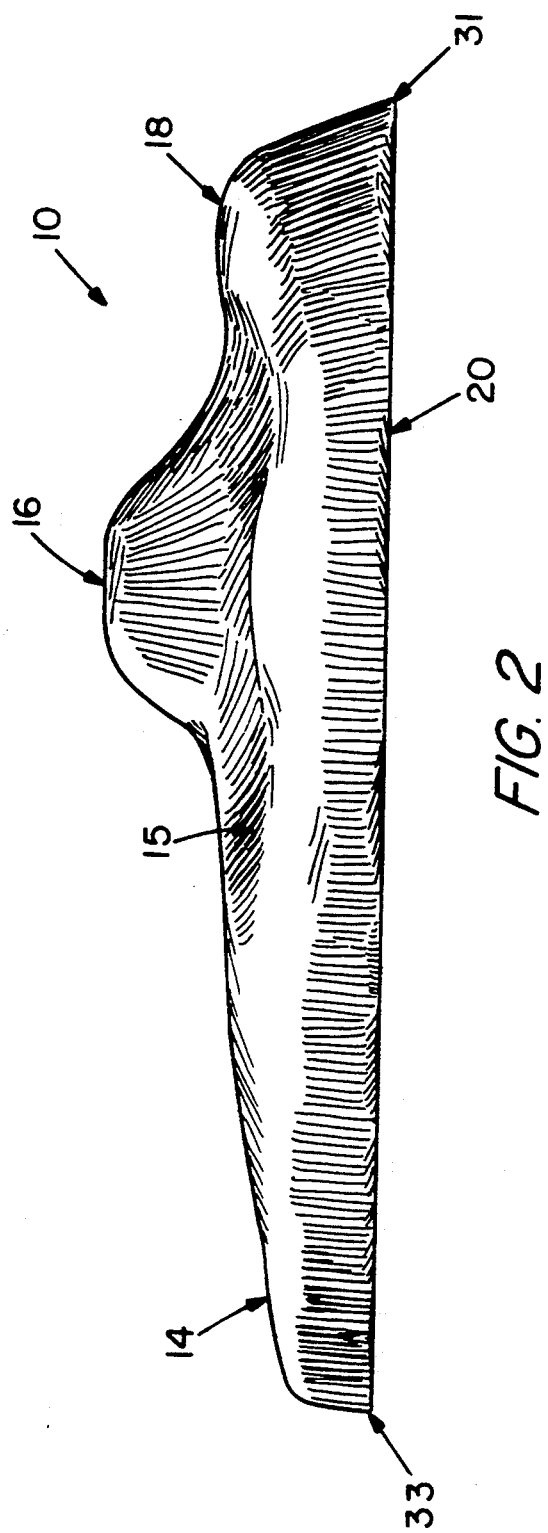
FIG. 2 is a side view of the preferred embodiment of the invention.

FIG. 2 is a side view of the device 10 of the present invention. Side finger supports 14 with grooves 15 are shown forming the distal end 33 of the device 10. The raised area 16 near the center of the device 10 is also shown. It places pressure on the user's hand to relax the fingers and extend the wrist slightly without hyperextending. The projected proximal area 18 is shown at the proximal end 31 of the device 10. This projected area 18 supports the wrist in a neutral position to distribute mechanical stresses proximal to the base of the palm. The smooth bottom 20 on the device 10 allows the device to glide easily along the user's desk or mouse pad.

Figure 3:
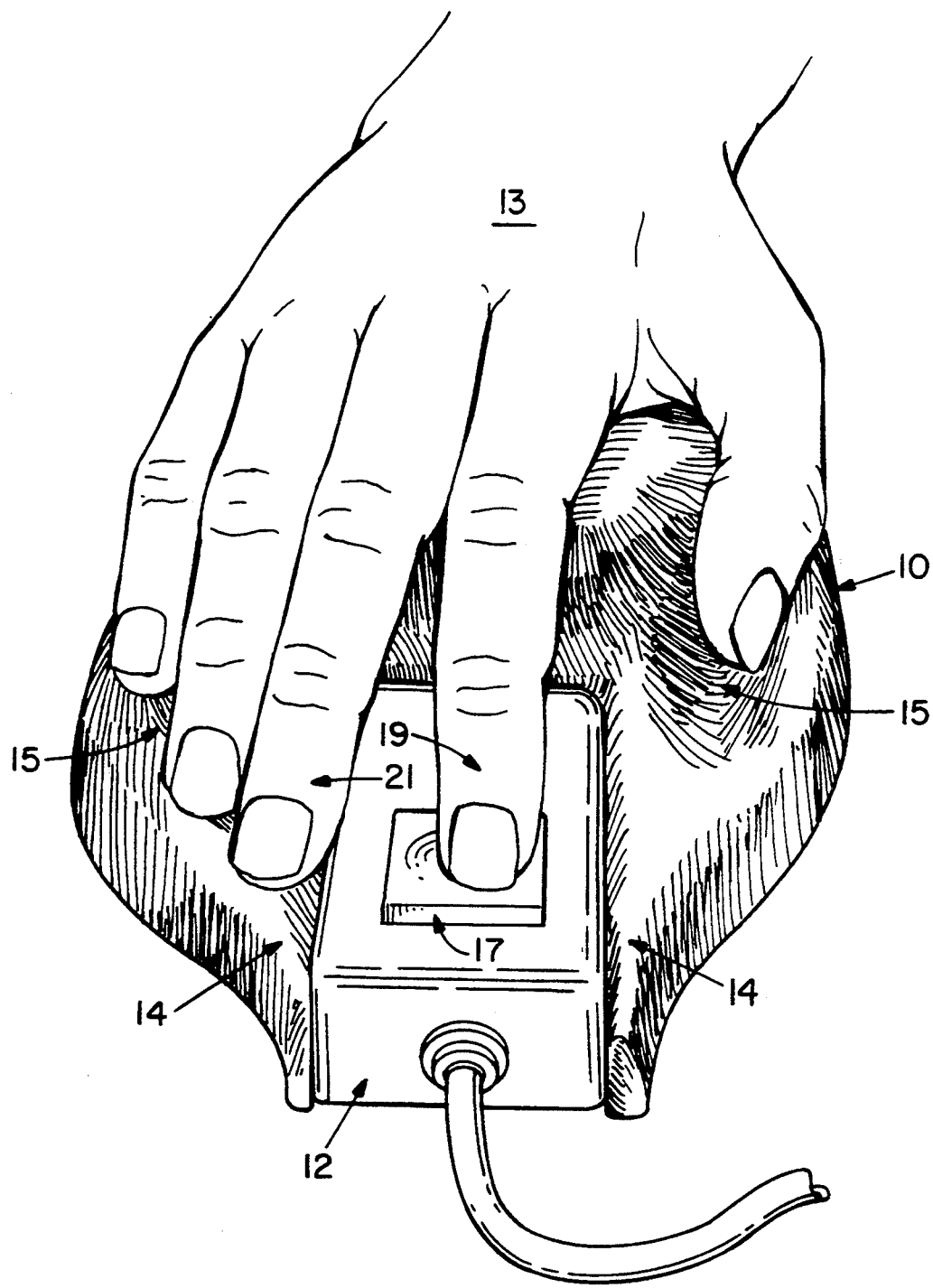
FIG. 3 is a perspective view of the preferred embodiment attached to a one-button mouse and supporting computer user's hand.

FIG. 3 shows the device 10 attached to a standard one-button mouse 12 and supporting a human hand 13. Taken as a whole, the width and length of the device 10 distributes stress uniformly over the thenar eminences, placing the stress over as large an area as possible, thus minimizing the impact of the stress. The rounded edges of the device 10 also prevent undue mechanical stress. With the hand 13 supported by the device 10 as shown, stress on the small muscle groups of the hand 13 is relieved. The device 10 encourages the use of the larger more proximal musculature, such as the elbow and shoulder flexors and extensors, rather than the tiny more easily stressed hand muscles to move the mouse 12 around the mouse pad or desk.

The side finger supports 14 are shown holding the mouse 12 securely in position so that the mouse 12 and device 10 glide smoothly together around the mouse pad or desk without becoming detached. The grooves 15 of the finger supports 14 help position the hand 13 so as to encourage clicking the mouse button 17 with the index finger 19 or a combination of fingers rather than with the middle finger 21 exclusively, thus reducing potentially damaging continual flexion and extension of the middle finger 21. The side finger supports 14 and grooves 15 also ensure that the fingers rest on their ventral surface, preventing ulnar and radial digital nerve compression. Also, the non-clicking fingers rest in the grooves 15 to prevent a constant gripping motion and thus reduce force of exertion.

Figure 4:
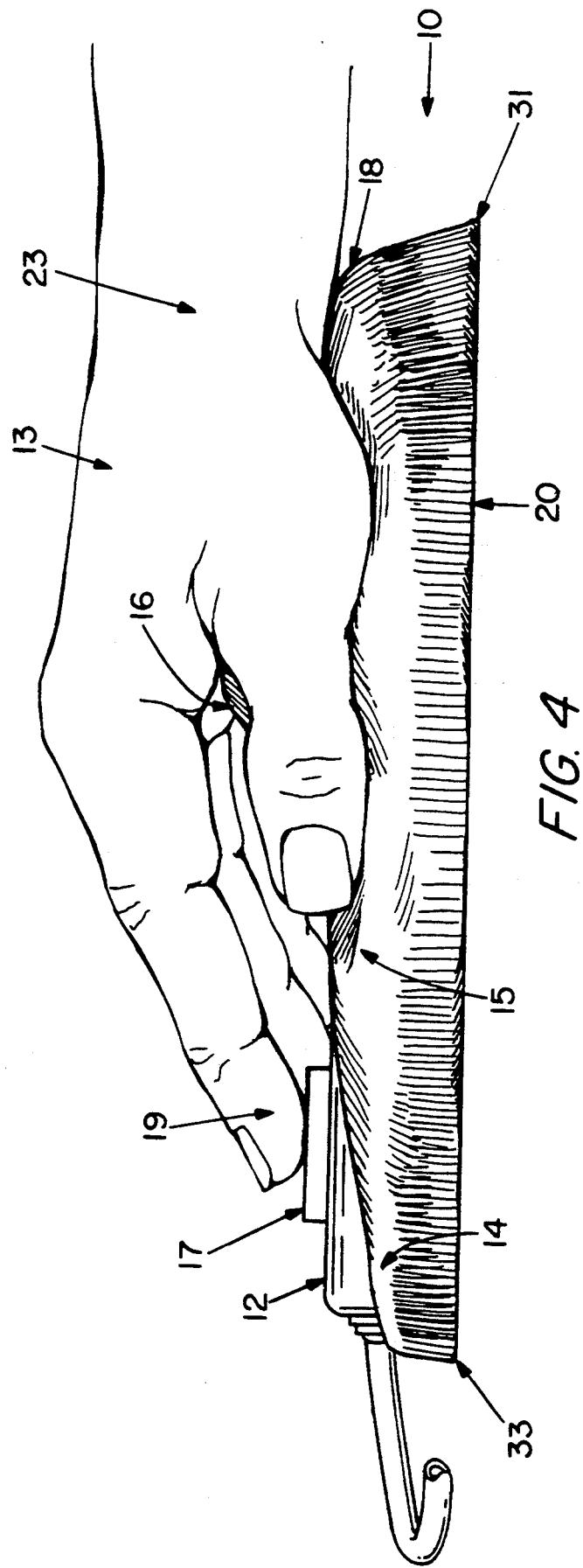
FIG. 4 is a side view of the preferred embodiment attached to a one-button mouse and supporting a computer user's hand.

FIG. 4 is a side view of the device 10 attached to a one-button mouse 12 and supporting a human hand 13. Once again, the fingers are shown resting in grooves 15 of finger supports 14. The index finger 19 is in position on the mouse button 17 of the mouse 12.

In this view, the raised area 16 near the center of the device 10 is shown. The raised area 16 places gentle pressure on the palm of the hand 13, causing the fingers to relax and the wrist 23 to extend slightly, without hyper-extending. The projected proximal area 18 provides a wrist rest to keep the wrist 23 in a neutral position as shown. Wrist and finger fatigue are reduced, and unnecessary and excessive strain and stress on the tendons controlling the fingers and hand 13 are lessened. The projected proximal area 18 also keeps the wrist 23 supported to distribute the mechanical stress proximal to the base of the palm, preventing median nerve damage. The smooth bottom 20 on the device 10 enables it to glide easily on the user's desk or mouse pad, reducing the amount of force required to move the mouse 12 across the mouse pad or desk.

The device 10 may be pre-made to meet the size and shape requirements of specific mice 12, such as Apple Macintosh and Microsoft mice, as well known in the industry, as well as to meet the size and shape requirements of average sizes of hands. The sizes may include men's, women's, and children's in small, medium, and large. In one specific device 10 made for a woman's medium-sized hand, the approximate dimensions of the device 10 are as follows. The overall length of the device 10 from proximal end 31 to distal end 33 is 8 inches. The overall width at the widest point is 6 inches. The distance between the proximal end 31 of the device 10 and the center of the raised area 16 is 3 inches. The distance between the centers of the two grooves 15 in the finger supports 14 is 4 inches.

Figure 5:
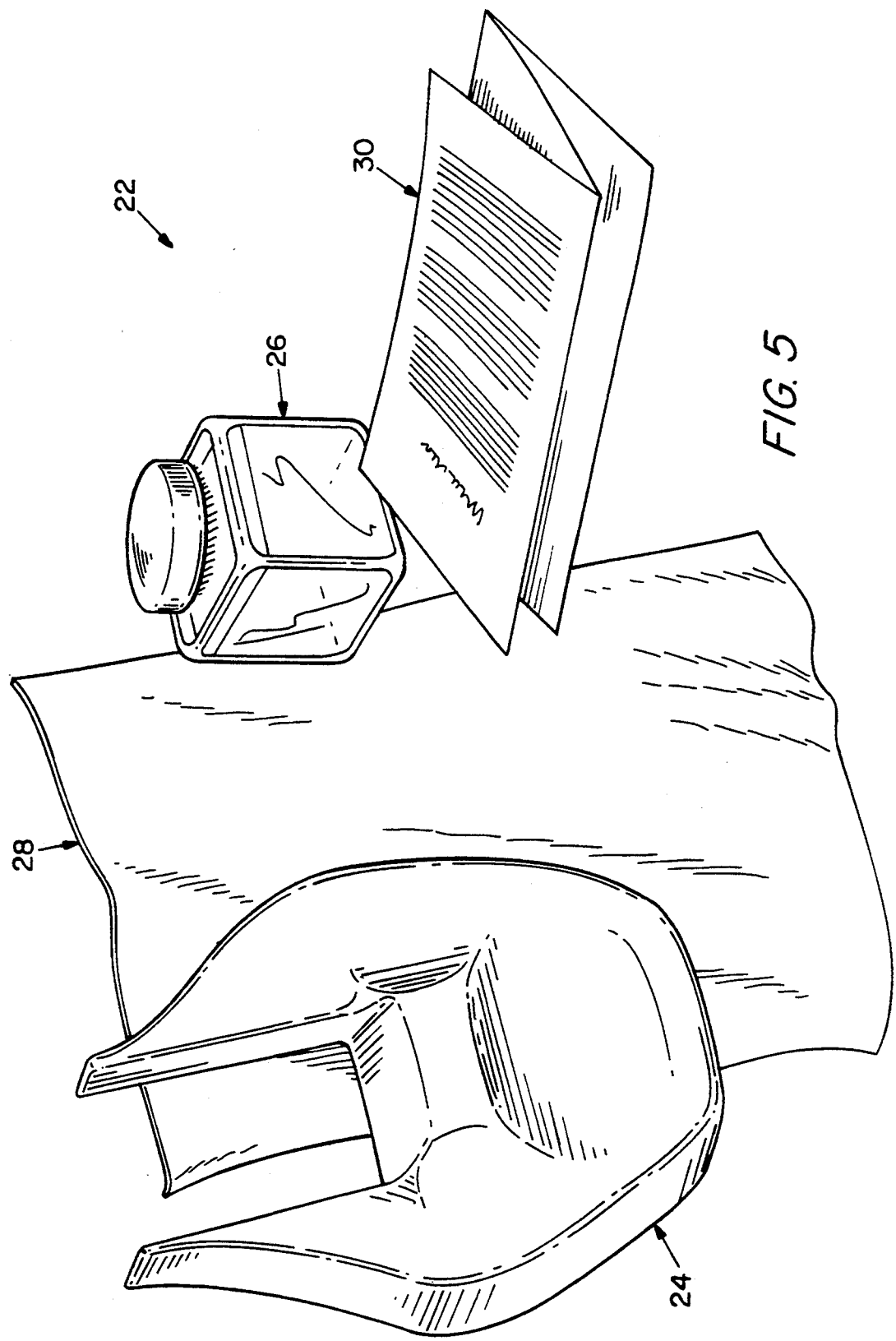
FIG. 5 is a perspective view of the components of the customization kit of the present invention.

The device 10 may also be custom-made through the use of a kit 22 (see FIG. 5) to meet the exact needs of a given computer user. FIG. 5 is a perspective view of the kit 22 which enables users, therapists or others to construct a customized version of the device 10. The kit 22 contains a partially pre-formed, but customizable, mold 24 made of well-known modelling clay, a lubricating substance 26, such as household mineral oil, a flat sheet of moldable material 28, such as a low-temperature thermoplastic, for example Polyflex II by Smith & Nephew Rolyan Inc., and explicit training instructions 30. The thermal plastic moldable material 28 is provided in a flat sheet. The sheet can be cut to shape with a razor blade. When placed in hot water, the plastic 28 becomes soft, flexible, and pliable and will take on the shape of an object over which it is draped. When warm, it can also be shaped and molded by hand. After approximately five minutes in room temperature air, the plastic 28 hardens into a smooth, non-breakable, and lightweight material in the shape of the object over or around which it was placed when still soft and warm. Additionally, when warm, two pieces of this thermoplastic 28 can be pinched, squeezed, and merged together, allowing for sealing seams or smoothing corners.

To make the custom computer mouse accessory 10, the kit 22 employs a partially pre-formed, but customizable, mold 24 constructed of modelling clay. The mold 24 is adjusted and shaped as desired. It may be bent in, spread out, indented, built up, flattened or otherwise adapted to match a specific hand and mouse. The user and therapist may test the mold 24 in the user's working environment to ensure it is comfortable, effective, and that it achieves the desired therapeutic goal.

Once the mold 24 has been customized, it is covered with a lubricating substance 26, such as household mineral oil. Then the moldable material 28 is heated, draped and folded over the customized model. It is trimmed to fit, allowed to harden, and removed from the mold 24. This moldable material 28 becomes the hand and wrist support device 10 for the computer mouse 12. A flat bottom 20 made of the same moldable material 28 is then added to the now-shaped moldable material 28 by pinching the two pieces together to ensure the device's smooth movement. As a final step, the completed device 10 may be sprayed with a faux granite paint or other substance which creates a rough and grippable surface texture 19. The model 24 made of modelling clay may be discarded or reused.

While the invention has been particularly shown and described with references to a preferred embodiment thereof, it will be understood by those skilled in the art that various changes in form and details may be made therein without departing from the spirit and scope of the invention as defined by the appended claims.

We claim:

1. A computer mouse accessory comprising:
   a support block for supporting the fingers and hand of a user of a computer mouse, a bottom portion of the computer mouse contacting a surface such that the user interfaces with a computer by moving the bottom portion of the computer mouse relative to the surface, the support block comprising finger supports extending from the support block to extend along opposite sides of the computer mouse and to support the user's fingers along the sides of the computer mouse, an opening between the finger supports allowing the bottom portion of the computer mouse to contact the surface; and
   a retainer for retaining the computer mouse in fixed relation to the support block as the support block and the computer mouse are moved relative to the surface such that the bottom portion of the computer mouse moves relative to the surface to interface with the computer.

2. The computer mouse accessory of claim 1 wherein the support block comprises a raised area for pressing into the palm of the user's hand.

3. The computer mouse accessory of claim 1 wherein the support block comprises an extended wrist rest area for supporting the user's wrist.

4. The computer mouse accessory of claim 1 wherein the retainer comprises the finger supports for supporting the user's fingers.

5. The computer mouse accessory of claim 1 wherein the retainer comprises extensions extending from the block.

6. The computer mouse accessory of claim 1 wherein a top surface of each finger support comprises a grooved area in which the user's fingers can rest.

7. The computer mouse accessory of claim 5 wherein the extensions comprise the finger supports.

8. A computer mouse accessory comprising:
   a support block for supporting the fingers and hand of a user of a computer mouse, a bottom portion of the computer mouse contacting a surface such that the user interfaces with a computer by moving the bottom portion of the computer mouse relative to the surface, sad support block comprising:
- a raised area for pressing into the palm of the user'- hand,
- a finger support area comprising finger supports extending from the support block for supporting the user's fingers, an opening between the finger supports allowing the bottom portion of the computer mouse to contact the surface; and
- a retainer for retaining the computer mouse in fixed relation to the support block as the support block and the computer mouse are moved relative to the surface such that the bottom portion of the computer mouse moves relative to the surface to interface with the computer, said retainer comprising extensions extending from the support block, the extensions comprising the finger supports of the finger support area.

9. A kit for making a customized computer mouse accessory for supporting the fingers and hand of a user of a computer mouse, said kit comprising:
- a customizable mold having the approximate shape of the computer mouse accessory, said computer mouse accessory comprising:
  - a support block for supporting the fingers and hand of a user of a computer mouse, a bottom portion of the computer mouse contacting a surface such that the user interfaces with a computer by moving the bottom portion of the computer mouse relative to the surface, the support block comprising finger supports extending from the support block to extend along opposite sides of the computer mouse and to support the user's fingers along the sides of the computer mouse, an opening between the finger supports allowing the bottom portion of the computer mouse to contact the surface; and
  - a retainer for retaining the computer mouse in fixed relation tot he support block as the support block and the computer mouse are moved relative to the surface such that the bottom portion of the computer mouse moves relative to the surface to interface with the computer; and
- a sheet of moldable material for molding to the shape of the customizable mold such that the moldable material, after being molded to the shape of the customizable mold, provides the computer mouse accessory.

10. The computer mouse accessory of claim 8 wherein a top surface of each finger support comprises a grooved area in which the user's fingers can rest.

11. A finger and hand support method comprises:
supporting the fingers and hand of a user of a computer mouse with a support bock, a bottom portion of the computer mouse contacting a surface such that the user interfaces with a computer by moving the bottom portion of the computer mouse relative to the surface, the supporting of the fingers being done by finger supports extending from the support block to extend along opposite sides of the computer mouse and to support the user's fingers along the sides of the computer mouse, an opening between the finger supports allowing the bottom portion of the computer mouse to contact the surface; and retaining the computer mouse in a fixed relation to the support block as the support block and the computer mouse are moved relative to the surface such that the bottom portion of the computer mouse moves relative to the surface to interface with the computer.

12. The method of claim 11 wherein the supporting step comprises pressing into the palm of the user'hand.

13. The method of claim 11 wherein the supporting step comprises supporting user's wrist with a wrist rest.

14. The method of claim 11 wherein the retaining step comprises providing extensions extending from the support block.

15. The computer mouse accessory of claim 14 wherein the extensions comprise the finger supports.

16. A finger and hand support method comprising:
supporting the fingers and hand of a user of a computer mouse with a support block, a bottom portion of the computer mouse contacting a surface such that the user interfaces with a computer by moving the bottom portion of the computer mouse relative to the surface, said supporting comprising:
pressing into the palm of the user's hand, and
supporting the user's fingers with finger supports extending from the support block to extend along opposite sides of the computer mouse and to support the user's fingers along the sides of the computer mouse, an opening between the finger supports allowing the bottom portion of the computer mouse to contact the surface; and
retaining the computer mouse in fixed relation to the support block with a retainer as the support block and the computer mouse are moved relative to the surface such that the bottom portion of the computer mouse moves relative to the surface to interface with a computer, the retainer comprising extensions extending from the support block to partially enclose the computer mouse, the extensions comprising the finger supports.

17. The method of claim 16 further comprising training the user's hand and wrist to operate the mouse in a position which will substantially prevent injury to the user's hand and wrist during use of the computer mouse.

18. A method of making a customized computer mouse accessory for supporting the fingers and hand of a user of a computer mouse, said method comprising:
shaping a customizable mold to have the approximate shape of the computer mouse accessory, said computer mouse accessory comprising:
- a support block for supporting the fingers and hand of a user of a computer mouse, a bottom portion of the computer mouse contacting a surface such that the user interfaces with a computer by moving the bottom portion of the computer mouse relative to the surface, the support block comprising finger supports extending from the support block to extend along opposite sides of the computer mouse and to support the user's fingers along the sides of the computer mouse, an opening between the finger supports allowing the bottom portion of the computer mouse to contact the surface; and
- a retainer for retaining the computer mouse in fixed relation to the support block as the support block and the computer mouse are moved relative to the surface such that the bottom portion of the computer mouse moves relative to the surface to interface with the computer;

molding a sheet of moldable material to the shape of the customizable mold; and removing the moldable material from the customizable mold, the moldable material providing the computer mouse accessory.

19. A computer mouse accessory comprising:

a support block for supporting the fingers and hand of a user of a computer mouse, the support block comprising finger supports extending from the support block to extend along opposite sides of the computer mouse and to support the user's fingers along the sides of the computer mouse, a top surface of each finger support comprising a grooved area in which the user's fingers can rest; and a retainer for retaining the computer mouse in fixed relation to the support block as the support block and the computer mouse are moved along a surface to interface with a computer.

20. A computer mouse accessory comprising:

a support block for supporting the fingers and hand of a user of a computer mouse, said support block comprising:

a raised area for pressing into the palm of the user's hand, an extended wrist rest area for supporting the user's wrist, and a finger support area comprising finger supports extending from the support block for supporting the user's fingers, a top surface of each finger support comprising a grooved area in which the user's fingers can rest; and a retainer for retaining the computer mouse in fixed relation tot he support block as the support block and the computer mouse are moved along a surface to interface with a computer, said retainer comprising extensions extending from the support block, the extensions comprising the finger supports of the finger support area.

* * * * *